United States Patent
Ruggiero et al.

(10) Patent No.: US 9,411,850 B1
(45) Date of Patent: Aug. 9, 2016

(54) PROCESS FOR EMBEDDED INTELLIGENCE

(75) Inventors: Jonathan David Ruggiero, Walnut Creek, CA (US); Paul Gustafson, Moraga, CA (US); Bruce Shay, San Leandro, CA (US); Nick Pouschine, Fremont, CA (US)

(73) Assignee: Workday, Inc., Pleasanton, CA (US)

( * ) Notice: Subject to any disclaimer, the term of this patent is extended or adjusted under 35 U.S.C. 154(b) by 81 days.

(21) Appl. No.: 13/443,192

(22) Filed: Apr. 10, 2012

(51) Int. Cl.
*G06F 17/30* (2006.01)
*G06F 7/00* (2006.01)
*G06F 17/00* (2006.01)

(52) U.S. Cl.
CPC .... *G06F 17/30395* (2013.01); *G06F 17/30386* (2013.01); *G06F 17/30398* (2013.01)

(58) Field of Classification Search
CPC ................... G06F 17/30386; G06F 17/30398; G06F 17/30395
USPC ......................................................... 707/769
See application file for complete search history.

(56) References Cited

U.S. PATENT DOCUMENTS

| | | | |
|---|---|---|---|
| 6,073,163 A | 6/2000 | Clark et al. | |
| 6,269,355 B1 * | 7/2001 | Grimse et al. | 706/46 |
| 6,765,689 B1 * | 7/2004 | Benstein | 358/1.18 |
| 7,603,375 B2 | 10/2009 | Ng et al. | |
| 8,024,651 B1 | 9/2011 | Error | |
| 2001/0043235 A1 | 11/2001 | Best et al. | |
| 2001/0051949 A1 | 12/2001 | Carey et al. | |
| 2002/0052771 A1 | 5/2002 | Bacon et al. | |
| 2002/0069214 A1 | 6/2002 | Smith et al. | |
| 2003/0140089 A1 * | 7/2003 | Hines et al. | 709/202 |
| 2004/0001092 A1 | 1/2004 | Rothwein et al. | |
| 2004/0019809 A1 * | 1/2004 | Sheinis et al. | 713/202 |
| 2004/0024622 A1 | 2/2004 | Knight | |
| 2004/0049436 A1 | 3/2004 | Brand et al. | |
| 2004/0179017 A1 | 9/2004 | Martyn et al. | |
| 2005/0216282 A1 | 9/2005 | Chen et al. | |
| 2006/0085243 A1 | 4/2006 | Cooper et al. | |
| 2006/0143220 A1 | 6/2006 | Spencer, Jr. | |
| 2007/0106642 A1 | 5/2007 | Kovrigin et al. | |
| 2007/0250840 A1 | 10/2007 | Coker et al. | |
| 2007/0266054 A1 * | 11/2007 | Stephens et al. | 707/200 |
| 2008/0015929 A1 | 1/2008 | Koeppel et al. | |
| 2008/0046805 A1 | 2/2008 | Shewchenko et al. | |
| 2009/0276771 A1 | 11/2009 | Nickolov et al. | |
| 2010/0017783 A1 | 1/2010 | Brininstool et al. | |
| 2010/0100427 A1 * | 4/2010 | McKeown et al. | 705/11 |
| 2010/0190475 A1 | 7/2010 | El-Kadri et al. | |
| 2012/0226623 A1 * | 9/2012 | Jurney et al. | 705/321 |

OTHER PUBLICATIONS

Skarnes et al., Method and Apparatus for Applet-Generated Screen Displays Using Computer Database and Programming Language, Oct. 25, 2001, WIPO.*
Gotz, David, et al. "HARVEST: an intelligent visual analytic tool for the masses." Published in Procceding IVITA '10 Proceedings of the first international workshop on Intelligent visual interfaces for text analysis, Feb. 7, 2010, ISBN: 978-1-60558-996-1 (pp. 1-4).

* cited by examiner

*Primary Examiner* — Kannan Shanmugasundaram
(74) *Attorney, Agent, or Firm* — Van Pelt, Yi & James LLP

(57) ABSTRACT

A system for executing an embedded intelligence process comprises an interface and a processor. The interface is for receiving an input object for a business process associated with an embedded intelligence applet. The processor is for searching a database for a set of objects. The set of objects is based at least in part on the input object. The processor is for determining display information for the embedded intelligence applet based at least in part on the set of objects.

19 Claims, 5 Drawing Sheets

PROCESS FOR EMBEDDED INTELLIGENCE

BACKGROUND OF THE INVENTION

A business manager makes many complex decisions over the course of each day. Enterprise business software has come to be relied upon for assisting a manager with his decision making by presenting him with data relevant to these decisions. For example, a manager who is considering giving an employee a raise might want to see data regarding the amount and timing of raises given to employees in the past, sorted by business division and employee performance level. Setting up this type of data analysis traditionally requires some level of software programming, and is not typically integrated into the decision making process. A manager would have to request the services of technical staff to prepare code for the report and utilizing the report would require switching tasks between report viewing and decision making.

BRIEF DESCRIPTION OF THE DRAWINGS

Various embodiments of the invention are disclosed in the following detailed description and the accompanying drawings.

DETAILED DESCRIPTION

Figure 1:
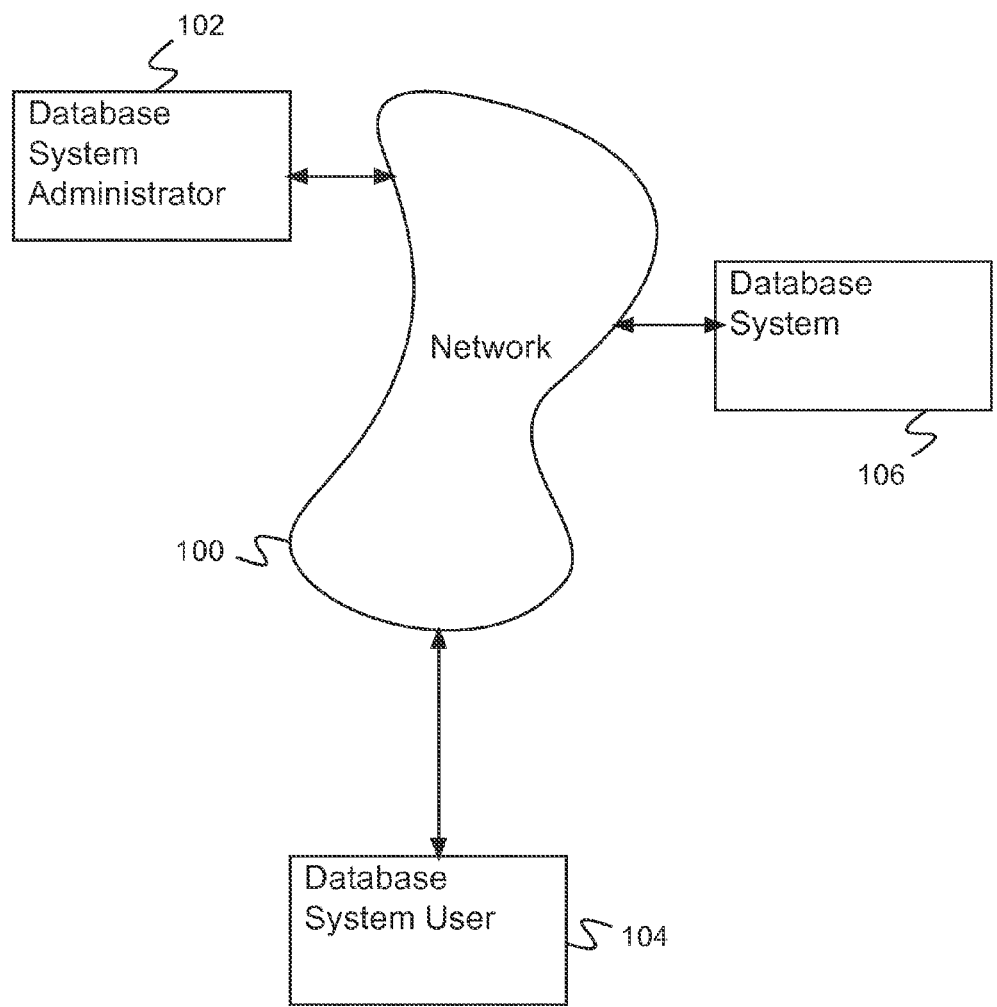
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for embedded intelligence is disclosed. The system comprises an interface and a processor. The interface is for receiving an input object for a business process associated with an embedded intelligence applet. The processor is to search a database for a set of objects. The set of objects is based at least in part on the input object. The processor is to determine display information for the embedded intelligence applet based at least in part on the set of objects.

A process for embedded intelligence is disclosed. A software application comprises a database, a set of business processes, and a set of embedded intelligence applets. Each business process modifies or accesses data stored in the database to accomplish a business process (e.g., hire an employee, modify the salary of an employee, give an employee a promotion, etc.). Business processes can receive input data (e.g., employee name, new employee salary, new employee title, etc.) from a business process user. Each embedded intelligence applet prepares a report on data stored within the database to assist a business manager with the decisions made in the business processes. An embedded intelligence applet may include a set of prompts, variables that need to be supplied to the embedded intelligence applet in order for it to run. When an embedded intelligence applet is added to a business process, the prompts are associated with business process exposed fields. For example, an embedded intelligence applet takes as an input an output provided by exposed fields that are available from a business process. These fields comprise available variables from the business process that can be output to provide input values to the embedded intelligence applet.

In some embodiments, business process exposed fields comprise data fields made available by the business process for use by embedded intelligence applets. Upon execution of the business process and the embedded intelligence applet, data for the embedded intelligence applet prompts is received from the associated business process exposed fields. The embedded intelligence applet retrieves data (e.g., from a data storage) and prepares a report based on data received from the business process and on the retrieved data. The embedded intelligence applets are made available automatically for the user of the business process so that no switching to another application is necessary in order for the functionality of the embedded intelligence applet to be visible, available, or interactive for the user. In various embodiments, the embedded intelligence applet is automatically triggered, is automatically made visible, is automatically made to be interactive with the user, is automatically launched, is automatically updated based on new values of input or updated input, or any other appropriate trigger.

FIG. 1 is a block diagram illustrating an embodiment of a network system. In the example shown, the network system comprises database system administrator 102, database system user 104, and database system 106, communicating via network 100. In various embodiments, network 100 comprises one or more of the following: a local area network, a wide area network, a wired network, a wireless network, the Internet, or any other appropriate network. Database system 106 comprises a database system for storage and retrieval of information. In some embodiments, database system 106 comprises a system for analysis of information. In some embodiments, database system 106 comprises a distributed database, e.g., a database system comprising multiple computers not necessarily in the same location. In some embodiments, database system 106 comprises a system for executing business processes. In some embodiments, database system 106 comprises a system for executing embedded intelligence applets. In some embodiments, database system 106 comprises a system for a process for embedded intelligence.

Database system administrator 102 comprises a database system administrator administrating database system 106. In some embodiments, database system administrator 102 comprises an employee at a company purchasing database system services. In some embodiments, administrating database system 106 comprises preparing, configuring, or modifying database system 106 as desired by database system users (e.g., database system user 104). In some embodiments, database system administrator 102 configures and modifies database system 106 in ways not available to database system user 104. Database system user 104 comprises a database user accessing database services on database system 106. In some embodiments, database system user 104 comprises an employee at a company purchasing database system services. In various embodiments, there are 1, 2, 4, 13, 22, 115, or any other appropriate number of database system users accessing database services on database system 106. In some embodiments, each database system user only has access to their own data stored on database system 106 and is able to utilize database system 106 as though they are the sole database system user. In some embodiments, database system user 104 configures services on database system 106. In some embodiments, the ability of database system user 104 to configure database system 106 is limited compared with that of database system administrator 102. In some embodiments, a database system user (e.g., database system user 104) comprises a person accessing database system 106 via a user interface, e.g., a web page. In some embodiments, a database system user comprises an automated system accessing database system 106 via a machine interface, e.g., a public application programming interface (API).

Figure 2:
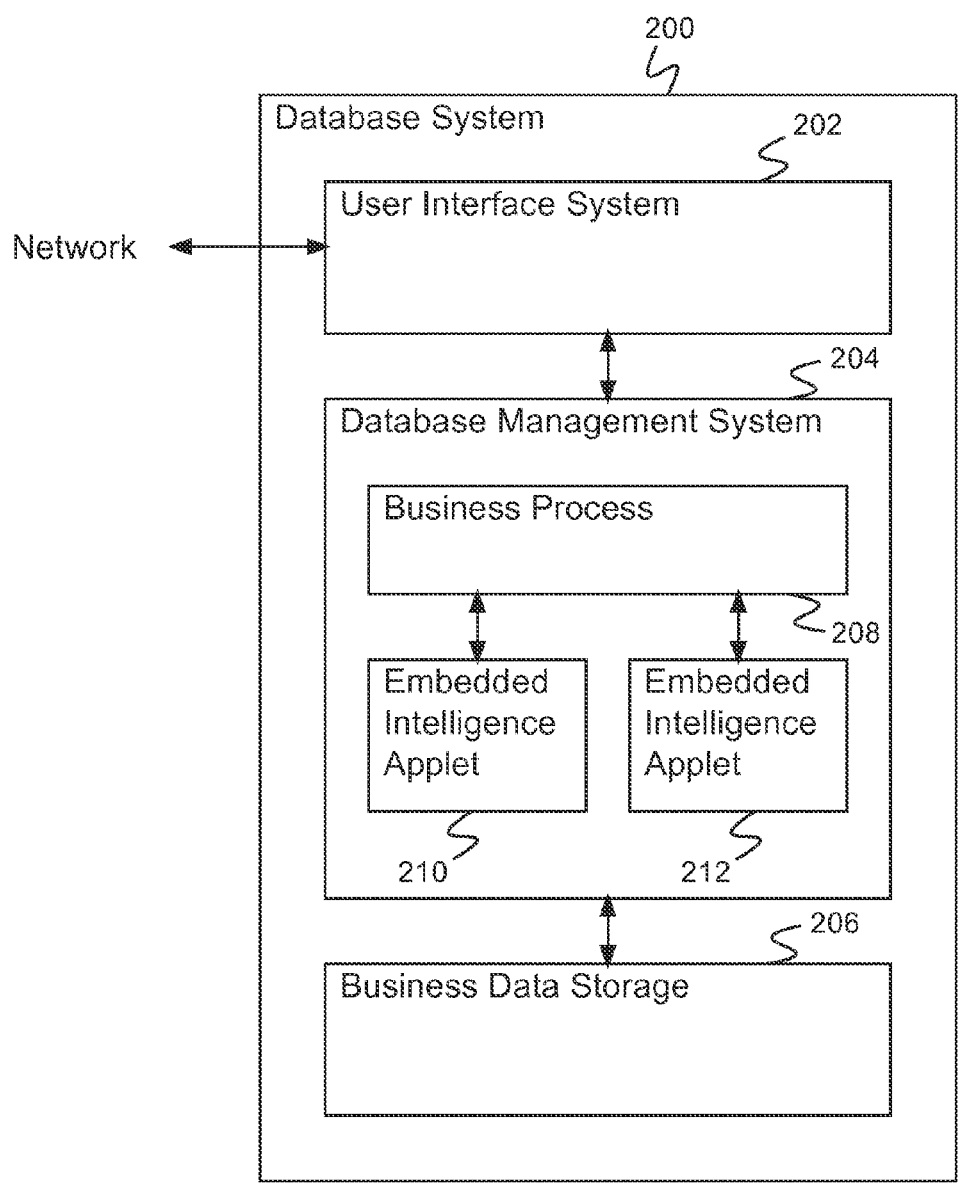
FIG. 2 is a block diagram illustrating an embodiment of a database system.

FIG. 2 is a block diagram illustrating an embodiment of a database system. In some embodiments, database system 200 comprises database system 106 of FIG. 1. In the example shown, user interface system 202 communicates with a network, e.g., network 100 of FIG. 1. User interface system 202 comprises a system for interacting with a user over a network, e.g., a web page server. In various embodiments, a user uses user interface system 202 for querying database system 200, initiating jobs running on database system 200, modifying jobs running on database system 200, uploading data to database system 200, configuring database system 200, scheduling jobs to run at a particular time on database system 200, scheduling jobs to run at recurring intervals on database system 200, or any other appropriate use. In some embodiments, user interface 202 comprises an interface for receiving an input object for a business process associated with an embedded intelligence applet. Database management system 204 comprises a system for managing database system 200. Database management system 204 comprises software for organizing data, retrieving data, processing data, storing data, preparing reports from data, analyzing data, interpreting data, or any other appropriate function. Data is stored in business data storage 206. In some embodiments, database system 200 comprises an object-oriented database. In some embodiments, database system 200 comprises a distributed database. In some embodiments, database management system 204 comprises a processor configured to search a database for a set of objects, wherein the set of objects is based at least in part on the input object, and determine display information for the embedded intelligence applet based at least in part on the set of objects.

In the example shown, database management system 204 comprises business process 208, embedded intelligence applet 210, and embedded intelligence applet 212. In some embodiments, database management system 204 includes more than one business process. In various embodiments, database management system 204 comprises 1, 2, 4, 7, 11, 14, 22, 315, 1009, 3021, or any other appropriate number of business processes. A business process comprises software for executing a business task, e.g., hiring an employee, modifying the salary of an employee, giving an employee a promotion, transferring an employee between business divisions, or any other appropriate business task. Business processes contain a number of fields to be filled out in the course of executing the business process, e.g., employee name, new employee salary, new employee title, new employee business division, or any other appropriate business process field. In some embodiments, a business process is broken into a set of pages, each comprising a subset of the business task and data entry fields. Embedded intelligence applet 210 and embedded intelligence applet 212 communicate with business process 208. Database management system 204 comprises any appropriate number of embedded intelligence applets. Each embedded intelligence applet (e.g., embedded intelligence applet 210, embedded intelligence applet 212) communicates with any appropriate number of business processes (e.g., business process 208). In various embodiments, database management system 204 comprises 1, 3, 4, 6, 12, 22, 222, 515, or any other appropriate number of embedded intelligence applets.

An embedded intelligence applet comprises software for analyzing data and preparing a report embedded with a business process. In some embodiments, an embedded intelligence applet is referred to as a worklet. When a database system user (e.g., database system user 104 of FIG. 1) accesses the database system (e.g., database system 106 of FIG. 1) and executes a business process (e.g., business process 208), embedded intelligence applets communicating with the business process (e.g., embedded intelligence applet 210, embedded intelligence applet 212) are shown embedded in the business process. The embedded intelligence applets are designed to provide the database system user with intelligence in order to assist with decisions made during the execution of the business process. For instance, a salary modification business process requires the database system user to input the new salary as part of the process, thus the user must decide what the new salary ought to be. An embedded intelligence applet embedded with the salary modification process prepares information relevant to that decision, e.g., job performance of the employee, recent salary modifications of employees in the same division, average time between salary modifications and time since the employee's last salary modification, or any other appropriate information.

In some embodiments, the embedded intelligence applet provides information by receiving the input information associated with the process and looks for related information in the database. For example, in the event that a raise process is being used, the applet provides salary data for employees with the same job classification (e.g., laterally relevant data), provides employee salary data (e.g., background data, or vertically relevant data, etc.), provides employee data for those with salary similar to the contemplated raise salary (e.g., forecasted laterally relevant data), or any other appropriate data. In some embodiments, related information comprises results from a search on a database (e.g., an object database). In some embodiments, the search on the database comprises a search based at least in part on an attribute of an object received as an input object. In some embodiments, the search on the database comprises a search based at least in part on an attribute of an object related to the input object.

Embedded intelligence applet 210 and embedded intelligence applet 212 receive data from business process 208 as part of their data analysis and report preparation. For instance, when a user enters an employee name into a modify employee salary process, embedded intelligence applet 210 and embedded intelligence applet 212 receive the employee name and can execute further data analysis and report preparation based on it, e.g., finding the performance records of the employee and presenting them to the database user. In some embodiments, database management system 204 comprises a processor configured to receive an input data for a business process (e.g., business process 208), receive a stored data (e.g., from business data storage 206) for an embedded intelligence applet (e.g., embedded intelligence applet 210 or embedded intelligence applet 212), and determine display information for the embedded intelligence applet based at least in part on the input data and the stored data.

Figure 3:
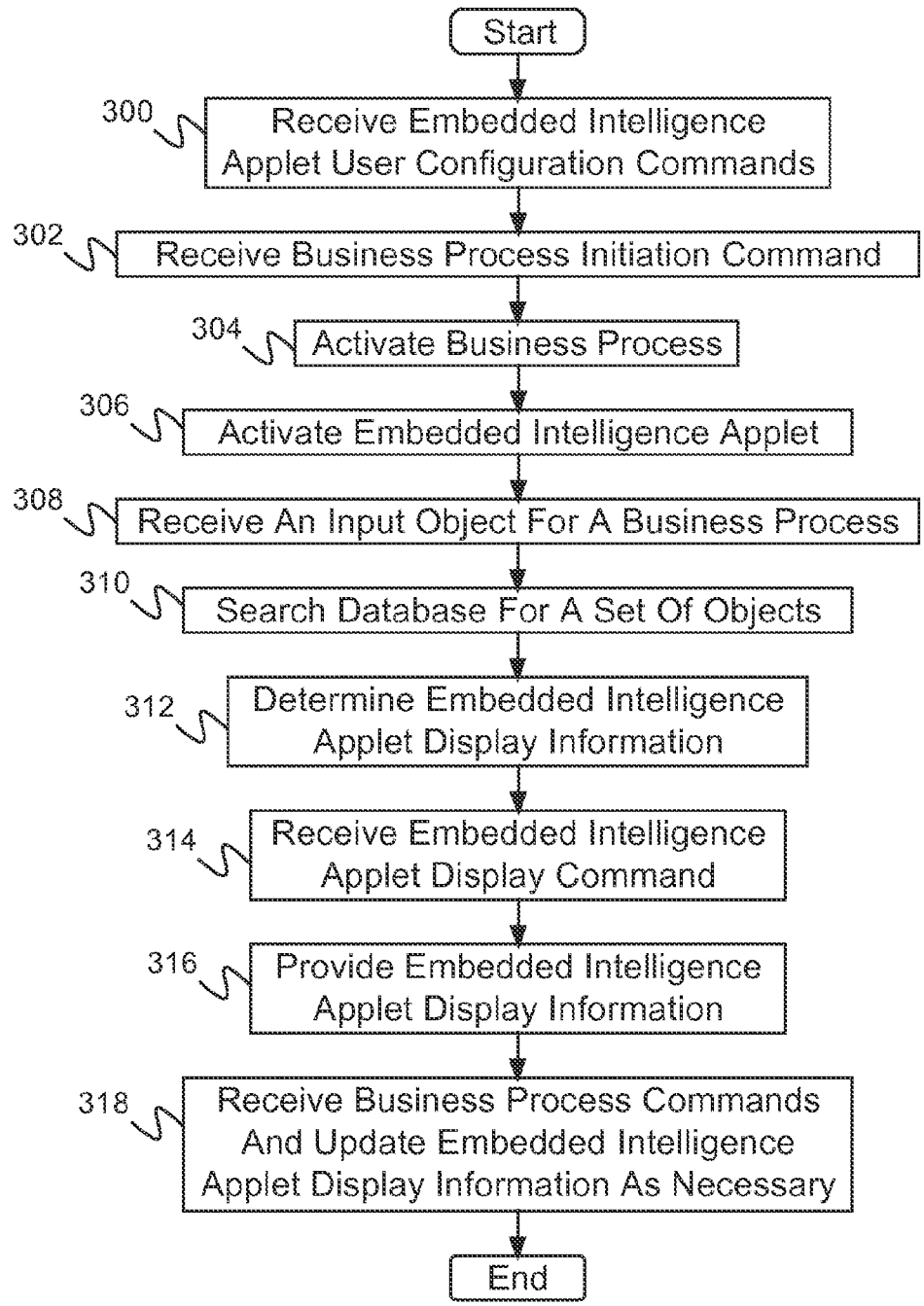
FIG. 3 is a flow diagram illustrating an embodiment of a process for embedded intelligence.

FIG. 3 is a flow diagram illustrating an embodiment of a process for embedded intelligence. In some embodiments, the process of FIG. 3 is executed by database management system 204 of FIG. 2. In some embodiments, the process of FIG. 3 is executed in communication with a database user (e.g., database user 104 of FIG. 1). In the example shown, in 300, embedded intelligence applet user configuration commands are received. In some embodiments, an embedded intelligence applet is configurable. In some embodiments, embedded intelligence applet user configuration commands comprise user commands for configuring an embedded intelligence applet display. In various embodiments, embedded intelligence applet user configuration commands comprise embedded intelligence applet show/hide window default status commands, embedded intelligence applet sequence commands, embedded intelligence applet open/closed default commands, or any other appropriate embedded intelligence applet user configuration commands. In some embodiments, 300 is skipped and the embedded intelligence applet default configuration is used. In 302, a business process initiation command is received. In some embodiments, a business process initiation command comprises a selection of a business process. In various embodiments, a selection of a business process comprises a selection of a business process from a list of business processes, from a category tree of business processes, from a set of search results for business processes, by typing the name into a business process name field, or in any other appropriate way. In some embodiments, a business process initiation command is automatically generated, e.g., at a predetermined time, in response to an event, etc. In 304, the business process is activated. In some embodiments, activating the business process comprises executing the business process software. In some embodiments, activating the business process comprises displaying a business process window to a user (e.g., via user interface system 202 of FIG. 2). In some embodiments, a business process window includes a prompt for input. In some embodiments, activating a business process comprises prompting for input. In some embodiments, activating a business process comprises issuing an embedded intelligence applet activation command. In 306, an embedded intelligence applet is activated. In some embodiments, more than one embedded intelligence applet is activated. In some embodiments, activating the embedded intelligence applet comprises displaying an embedded intelligence applet window to a user (e.g., via user interface system 202 of FIG. 2). In some embodiments, activating the embedded intelligence applet comprises executing the embedded intelligence applet software. In some embodiments, activating the embedded intelligence applet comprises activating the embedded intelligence applet hidden and displaying it to a user when an embedded intelligence applet display command is received. In some embodiments, the business process determines whether an embedded intelligence applet display command has been received. In some embodiments, the system is configured (e.g., using embedded intelligence applet user configuration commands received in 300) such that an embedded intelligence applet display command is received automatically upon activating the business process. In some embodiments, the business process is configured to display in the event that the embedded intelligence applet display command has been received. In some embodiments, one or more embedded intelligence applets are associated with the business process and are predetermined as the embedded intelligence applets to be activated when the business process is activated. In some embodiments, one or more embedded intelligence applets are configured as the embedded intelligence applets to be activated (e.g., using embedded intelligence applet user configuration commands received in 300). In some embodiments, an embedded intelligence applet selection interface is displayed and one or more embedded intelligence applets are selected from the embedded intelligence applet selection interface to be activated.

In 308, an input object for a business process is received. An input object for a business process is received from a user entering business process data into a business process interface. In some embodiments, an input object for a business process is received from a field in a business process interface when the user entering business process data advances to the next field in the business process interface. In some embodiments, business process data comprises an input object for a business process. In 310, a database is searched for a set of objects. In some embodiments, the set of objects is searched for based on data programmed into the embedded intelligence applet. In some embodiments, the set of objects is searched for based at least in part on the input object (e.g., the input object received in 308). In various embodiments, the set of objects is searched for based at least in part on the classification of the input object, based at least in part on the attributes of the input object, based at least in part on a criteria determined from the input object, or based at least in part on the input object in any other appropriate way. In some embodiments, the set of objects is searched for to determine a set of objects to be compared with the input objects (e.g., in a graph, a chart, a table, etc.). In some embodiments, the business process and the embedded intelligence applet are associated, and the embedded intelligence applet receives business process data from the business process. In some embodiments, the processor is configured to search for the set of objects based on the input object as indicated by the embedded intelligence applet. In some embodiments, the set of objects is searched for in a business data storage (e.g., business data storage 206 of FIG. 2). In 312, embedded intelligence applet display information is determined. In some embodiments, embedded intelligence applet display information is determined based at least in part on the set of objects searched for in 310. In some embodiments, embedded intelligence applet display information is determined to compare the set of objects searched for in 310 with the input object. In some embodiments, embedded intelligence applet display information is determined to give context to a business process. In various embodiments, embedded intelligence applet display information is determined based on processing the set of objects searched for in 310, based on displaying the set of objects searched for in 310, based on displaying an attribute of each of the set of objects searched for in 310, or based on the set of objects searched for in 310 in any other appropriate way. In 314, an embedded intelligence applet display command is received. In some embodiments, the business process is configured to display applet information in the event that the embedded intelligence applet display command has been received. In some embodiments, an embedded intelligence applet display command is received from a user making an indication to an embedded intelligence applet display button. In some embodiments, the embedded intelligence display button makes a visual indication (e.g., a flash, a change of color, rotation, etc.) in response to embedded intelligence applet display information being determined (e.g., in 312). In 316, embedded intelligence applet display information is provided. In some embodiments, providing embedded intelligence applet display information comprises displaying an embedded intelligence applet window. In some embodiments, providing embedded intelligence applet display information comprises displaying embedded intelligence applet display information in an embedded intelligence applet window. In 318, business process commands are received and embedded intelligence applet display information is updated as necessary. In various embodiments, business process commands comprise next business process page commands, business process data, business process complete commands, or any other appropriate commands. In some embodiments, embedded intelligence display information is updated in response to new or modified business process data.

In some embodiments, the data available from the database to the embedded intelligent applet comprises data available to the user according the security policy (e.g., personal data or data associated with the user, data available to the role the user is associated with, etc.).

In some embodiments, the business process with its associated embedded intelligence applet has the ability to add/remove steps in the business process and yet still allow the embedded intelligence applet to trigger where their prompts have been satisfied (e.g., the linkage from exposed fields of the business process are output or transferred to the embedded intelligence applet as inputs).

Figure 4:
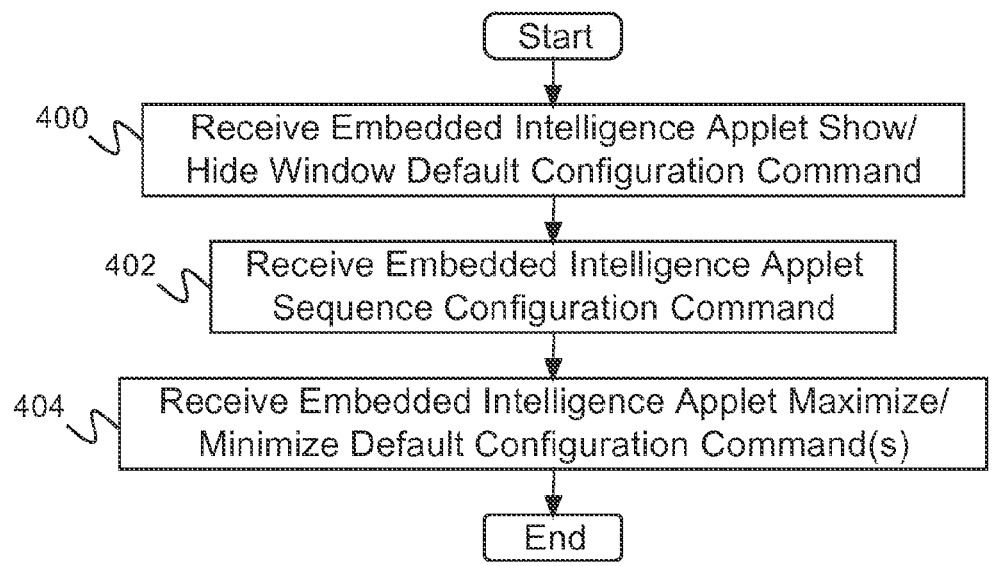
FIG. 4 is a flow diagram illustrating an embodiment of a process for receiving embedded intelligence applet configuration commands.

FIG. 4 is a flow diagram illustrating an embodiment of a process for receiving embedded intelligence applet configuration commands. In some embodiments, the process of FIG. 4 implements 300 of FIG. 3. In some embodiments, the process of FIG. 4 is executed by database management system 204 of FIG. 2. In some embodiments, the process of FIG. 4 is executed in communication with a database user (e.g., database system user 104 of FIG. 1). In the example shown, in 400, an embedded intelligence applet show/hide window default configuration command is received. In some embodiments, if an embedded intelligence applet show window default configuration command is received, an embedded intelligence applet display command is automatically issued when the embedded intelligence applet is activated (e.g., in 306 of FIG. 3), and the embedded intelligence applet display is shown as soon as the embedded intelligence applet is activated. In some embodiments, if an embedded intelligence applet hide window default configuration command is received, the embedded intelligence applet display is shown after an embedded intelligence applet display command is received (e.g., in 314 of FIG. 3). In 402, an embedded intelligence applet sequence configuration command is received. In some embodiments, an embedded intelligence applet sequence configuration command comprises a description of the embedded intelligence applet sequence. In some embodiments, the set of embedded intelligence applets (e.g., embedded intelligence applet 210 of FIG. 2, embedded intelligence applet 212 of FIG. 2) associated with a given business process (e.g., business process 208 of FIG. 2) is displayed sequentially in a window, and an embedded intelligence applet sequence configuration command describes the order that they are displayed in the window. In 404, an embedded intelligence applet maximize/minimize default configuration command or commands are received. In some embodiments, embedded intelligence applets can be maximized (e.g., shown at full size) or minimized (e.g., hidden) within the embedded intelligence applet display window, and embedded intelligence applet maximize/minimize default configuration commands comprise commands describing the default maximized or minimized status for each embedded intelligence applet.

Figure 5:
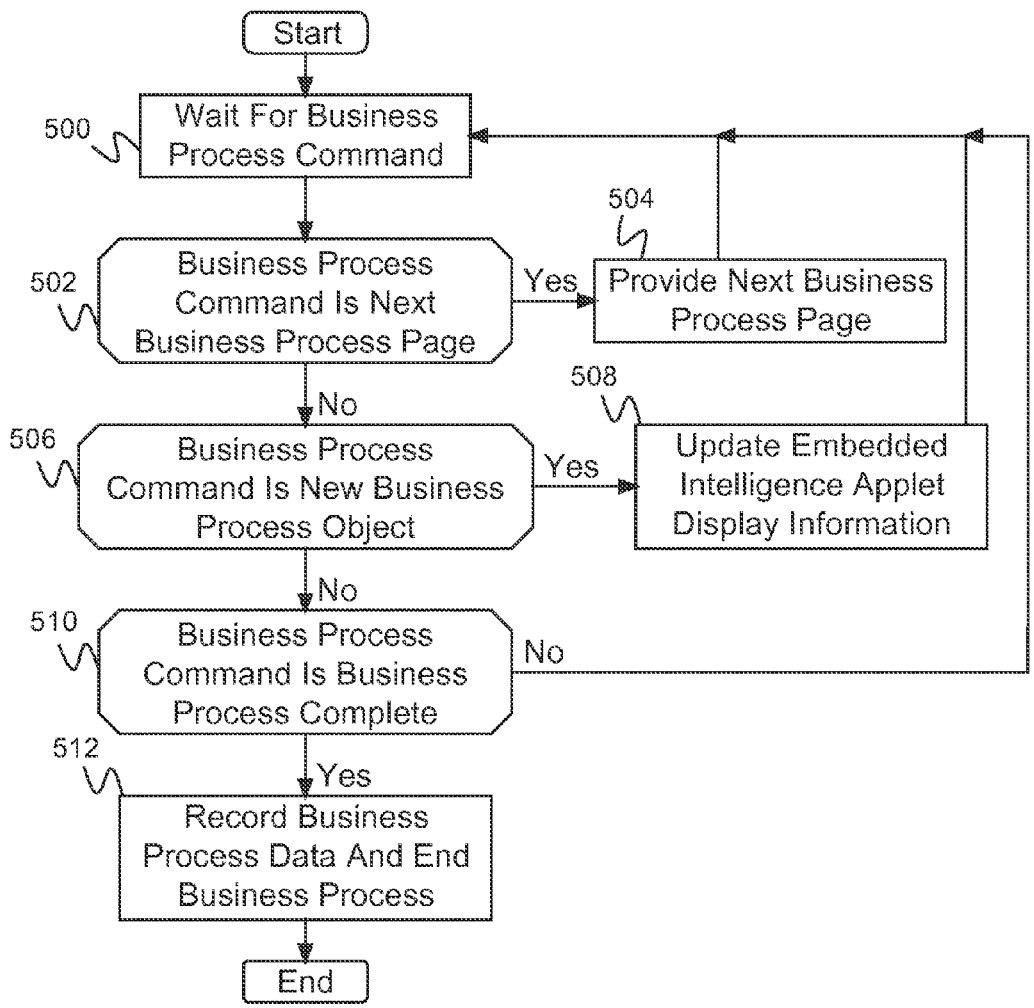
FIG. 5 is a flow diagram illustrating an embodiment of a process for receiving business process commands and updating embedded intelligence applet display information as necessary.

FIG. 5 is a flow diagram illustrating an embodiment of a process for receiving business process commands and updating embedded intelligence applet display information as necessary. In some embodiments, the process of FIG. 5 implements 318 of FIG. 3. In some embodiments, the process of FIG. 5 is executed by database management system 204 of FIG. 2. In some embodiments, the process of FIG. 5 is executed in communication with a database user (e.g., database system user 104 of FIG. 1). In the example shown, in 500, a business process command is awaited. In some embodiments, a user interface has been presented to a user (e.g., via user interface system 202 of FIG. 2), and the system is awaiting commands issued to the user interface. When a business process command has been received, control passes to 502. In 502, it is determined if the business process command is a next business process page command. If the business process command is a next business process page command, control passes to 504. In 504, the next business process page is provided. In some embodiments, providing the next business process page comprises providing the next section of the business process. Control then passes to 500. If the business process command was determined not to be a next business process page command in 502, control passes to 506. In 506, it is determined if the business process command is a new business process object. If it is determined in 506 that the business process command is a new business process object, control passes to 508. In 508, embedded intelligence applet display information is updated. In some embodiments, embedded intelligence applet display information is updated based on a new business process object. In some embodiments, a search of a database for a set of objects is repeated, wherein the set of objects is based at least in part on the new business process object. In some embodiments, embedded intelligence applet display information is updated based on the repeated search for the set of objects. In some embodiments, a new business process object is received after a user enters the business process data and clicks a button, pushes the return key, moves the mouse, moves keyboard focus away from the business process data entry field, or after any other appropriate data entry complete signifier. In some embodiments, updated embedded intelligence applet display information is displayed immediately after a data entry complete signifier has been received. Control then passes to 500. If it is determined in 506 that the business process command is not new or modified business data, control passes to 510. If it is determined in 510 that the business process command is a business process complete command, control passes to 512. In 512, the business process data is recorded (e.g., in a business data storage such as business data storage 206 of FIG. 2) and the business process is ended. In some embodiments, recording the business process data comprises writing the business process data to data storage, processing the business process data and writing the processed data to storage, transmitting data (e.g., via a network such as network 100 of FIG. 1), executing database management commands (e.g., by the database management system), or any other appropriate business process data recording task. The process then ends. If it is determined in 510 that the business process command is not a business process complete command, control passes to 500.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
an interface for:
receiving indication to activate a business process from a user, wherein the business process is associated with an embedded intelligence applet, wherein the business process comprises hiring an employee, modifying a salary of an employee, giving an employee a promotion, or transferring an employee between divisions of a business;
receiving an input object for the business process associated with an embedded intelligence applet, the interface displaying a set of prompts for inputting input objects for the business process, wherein the input object is received from a field in the interface as the user entering business process data advances to a next field in the interface, wherein receiving the input object as the user advances to the next field automatically activates the embedded intelligence applet and makes visible an embedded intelligence applet window on the interface, wherein the embedded intelligence applet is designed to provide a user with related information in order to assist with decisions made during the business process, and wherein the input object includes at least one of the following: an employee name, a new employee salary, a new employee title, and a new employee business division; and
a processor to:
search a database for a set of objects, wherein the set of objects comprises employee data, wherein the search on the database for employee data is based at least in part on at least one of the following: a classification of the input object, one or more attributes associated with the input object, and criteria determined based at least in part on the input object; and
analyze the set of objects comprising employee data for the related information in order to assist with decisions made during the business process;
determine display information for the embedded intelligence applet based at least in part on the analysis of the employee data;
providing the display information to the embedded intelligence applet window.

2. The system of claim 1, wherein the business process comprises software for executing a business task.

3. The system of claim 1, wherein the processor is further configured to receive a business process initiation command.

4. The system of claim 1, wherein the processor is further configured to activate the business process.

5. The system of claim 1, wherein the processor is further configured to retrieve one object of the set of objects.

6. The system of claim 1, wherein the processor is further configured to update display information for the embedded intelligence applet based on a new input object.

7. The system of claim 6, wherein the processor is further configured to repeat a search of a database for a new set of objects, wherein the new set of objects is based at least in part on the new input object.

8. The system of claim 1, wherein the processor is further configured to determine whether an embedded intelligence applet display command has been received.

9. The system of claim 8, wherein the processor is further configured to display applet information in the event that the embedded intelligence applet display command has been received.

10. The system of claim 1, wherein the embedded intelligence applet is configurable.

11. The system of claim 10, wherein embedded intelligence applet configurations comprise one or more of the following: an embedded intelligence applet show/hide window default status, an embedded intelligence applet sequence, or an embedded intelligence applet open/closed default.

12. The system of claim 1, wherein the search on the database is further based at least in part on one or more objects related to the input object.

13. The system of claim 1, wherein the display information includes one or more recent salary modifications of other employees in a same division as the employee.

14. The system as in claim 1, wherein the display information comprises a salary data of employees with a same job classification.

15. The system as in claim 1, wherein the display information comprises employee data for employees with similar salaries.

16. The system as in claim 1, wherein the analysis of the employee data comprises an average time between a plurality of salary modifications.

17. The system as in claim 1, wherein the analysis of the employee data comprises a time since the employee's last salary modification.

18. A method comprising:
receiving indication to activate a business process from a user, wherein the business process is associated with an embedded intelligence applet, wherein the business process comprises hiring an employee, modifying a salary of an employee, giving an employee a promotion, or transferring an employee between divisions of a business;
receiving an input object for the business process associated with an embedded intelligence applet, wherein the input object is received from an interface displaying a set of prompts for inputting input objects for the business process, wherein the input object is received from a field in the interface as the user entering business process data advances to a next field in the interface, wherein receiving the input object as the user advances to the next field automatically activates the embedded intelligence applet and makes visible an embedded intelligence applet window on the interface, wherein the embedded intelligence applet is designed to provide a user with related information in order to assist with decisions made during the business process, and wherein the input object includes at least one of the following: an employee name, a new employee salary, a new employee title, and a new employee business division;
searching a database for a set of objects, wherein the set of objects comprises employee data, wherein the search on the database for employee data is based at least in part on at least one of the following: a classification of the input object, one or more attributes associated with the input object, and criteria determined based at least in part on the input object;

analyzing the set of objects comprising employee data for the related information in order to assist with decisions made during the business process; and determining display information for the embedded intelligence applet based at least in part on the analysis of the employee data;

providing the display information to the embedded intelligence applet window.

19. A computer program product, the computer program product being embodied in a non-transitory computer readable storage medium and comprising computer instructions for:

receiving indication to activate a business process from a user, wherein the business process is associated with an embedded intelligence applet, wherein the business process comprises hiring an employee, modifying a salary of an employee, giving an employee a promotion, or transferring an employee between divisions of a business;

receiving an input object for the business process associated with an embedded intelligence applet, wherein the input object is received from an interface displaying a set of prompts for inputting input objects for the business process, wherein the input object is received from a field in the interface as the user entering business process data advances to a next field in the interface, wherein receiving the input object as the user advances to the next field automatically activates the embedded intelligence applet and makes visible an embedded intelligence applet window on the interface, wherein the embedded intelligence applet is designed to provide a user with related information in order to assist with decisions made during the business process, and wherein the input object includes at least one of the following: an employee name, a new employee salary, a new employee title, and a new employee business division;

searching a database for a set of objects, wherein the set of objects comprises employee data, wherein the search on the database for employee data is based at least in part on at least one of the following: a classification of the input object, one or more attributes associated with the input object, and criteria determined based at least in part on the input object;

analyzing the set of objects comprising employee data for the related information in order to assist with decisions made during the business process; and determining display information for the embedded intelligence applet based at least in part on the analysis of the employee data;

providing the display information to the embedded intelligence applet window.

* * * * *